April 28, 1953 R. B. BUCHANAN 2,636,944

RECORDING-COMPLETING CORD AND TRUNK CIRCUITS

Filed Dec. 29, 1948 4 Sheets-Sheet 1

INVENTOR
R. B. BUCHANAN
BY R. O. Covell
ATTORNEY

April 28, 1953 R. B. BUCHANAN 2,636,944

RECORDING-COMPLETING CORD AND TRUNK CIRCUITS

Filed Dec. 29, 1948 4 Sheets-Sheet 2

INVENTOR
BY R. B. BUCHANAN
R. D. Covell
ATTORNEY

April 28, 1953 R. B. BUCHANAN 2,636,944

RECORDING-COMPLETING CORD AND TRUNK CIRCUITS

Filed Dec. 29, 1948 4 Sheets-Sheet 3

INVENTOR
R. B. BUCHANAN
BY R. O. Covell
ATTORNEY

INVENTOR
R. B. BUCHANAN
BY R. O. Covell
ATTORNEY

Patented Apr. 28, 1953 2,636,944

UNITED STATES PATENT OFFICE 2,636,944

RECORDING-COMPLETING CORD AND TRUNK CIRCUITS

Russell B. Buchanan, Lynbrook, N. Y., assignor to Bell Telephone Laboratories, Incorporated, New York, N. Y., a corporation of New York Application December 29, 1948, Serial No. 67,868

4 Claims. (Cl. 179—6.3)

This invention relates to telephone systems and particularly to systems comprising automatic local offices and switchboards including manual switching operator positions.

In areas in which local office subscribers dial "0" to originate all toll calls, the dial systems "A" operators to which such calls are automatically extended may be able to complete only the short-haul toll calls; and calls to more distant points are completed by toll operators, the calling subscriber being asked to hang up until called back by a toll operator. Objects of the invention are an increased efficiency in the completion of toll calls from local dial office subscriber stations and the provision of switching means which enables the extension of such calls from dial system "A" operator positions to toll operator positions on a recording-completing basis, that is, without requiring that the calling subscriber hang up and wait until called by a toll operator.

This invention is a recording-completing cord for use at dial systems "A" operator positions in connecting recording-completing trunks incoming from local dial offices to other recording-completing trunks outgoing to toll operator positions. A feature of the invention is an arrangement whereby the two-way transmission of supervisory signals between interconnected incoming and outgoing recording-completing trunks is effected over the sleeve conductor of the dial systems "A" operator cord circuit through which these trunks are connected, ringing and coin-control signals being transmitted through the talking conductors.

The invention and its features are further explained herein by describing a system comprising local and toll offices in which the invention is embodied, one such a system being shown schematically in the drawing which consists of Figs. 1 to 5, inclusive.

Referring to the drawing:

Fig. 1 shows a local dial office including an outgoing recording-completing trunk circuit 22, a trunk T1, and a recording-completing trunk circuit 30, incoming to a dial systems "A" switchboard located in a toll office;

Fig. 2 shows a dial systems "A" operator position comprising cord circuits 40 and 50 and position and telephone circuits 78;

Fig. 4 shows an incoming recording-completing trunk circuit 130, connecting trunk T2 to a toll operator position; and Fig. 5 shows the relative position in which Figs. 1 to 4 are to be placed to form an operative arrangement.

*General description*

Figure 1:
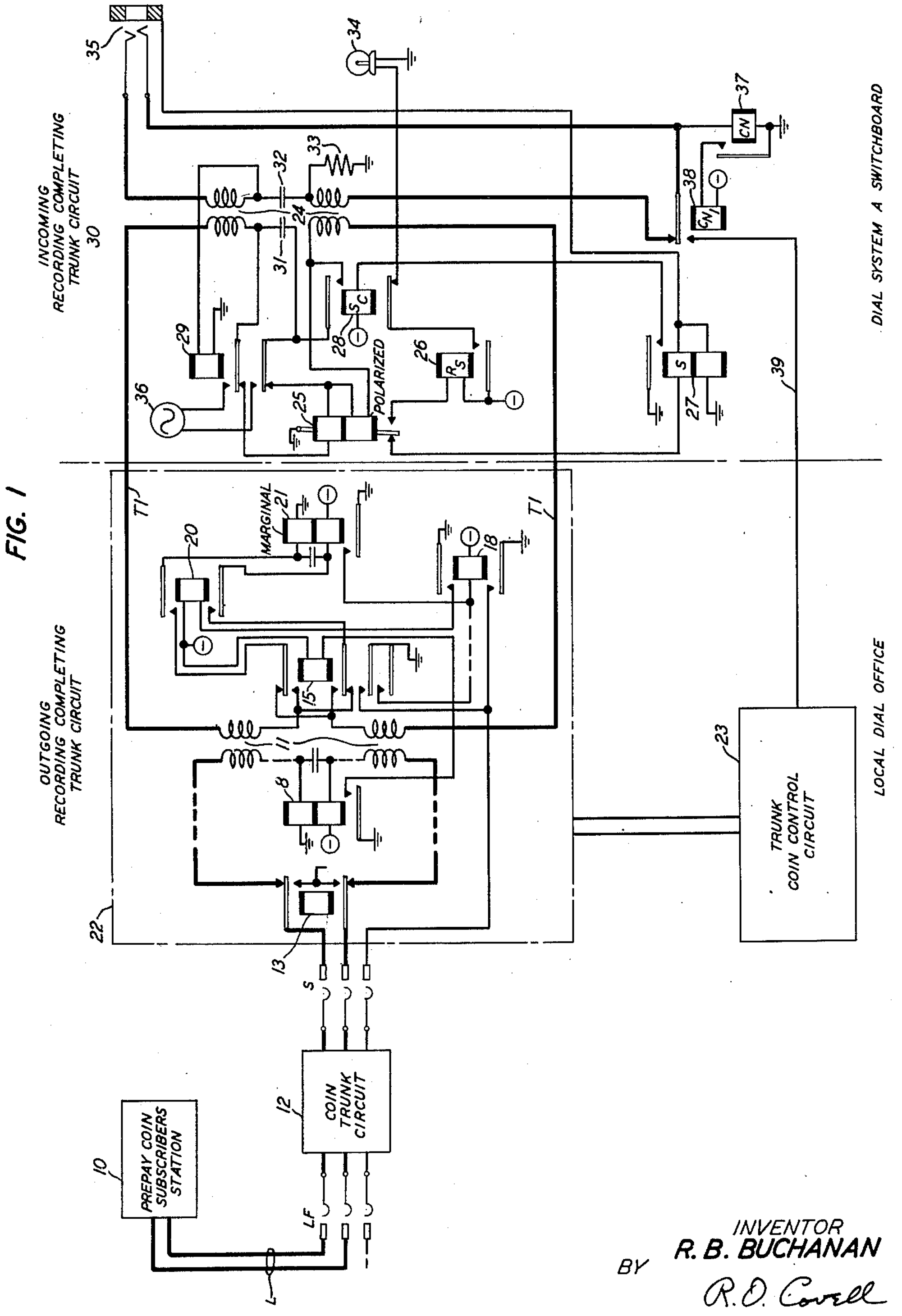
Figure 2:
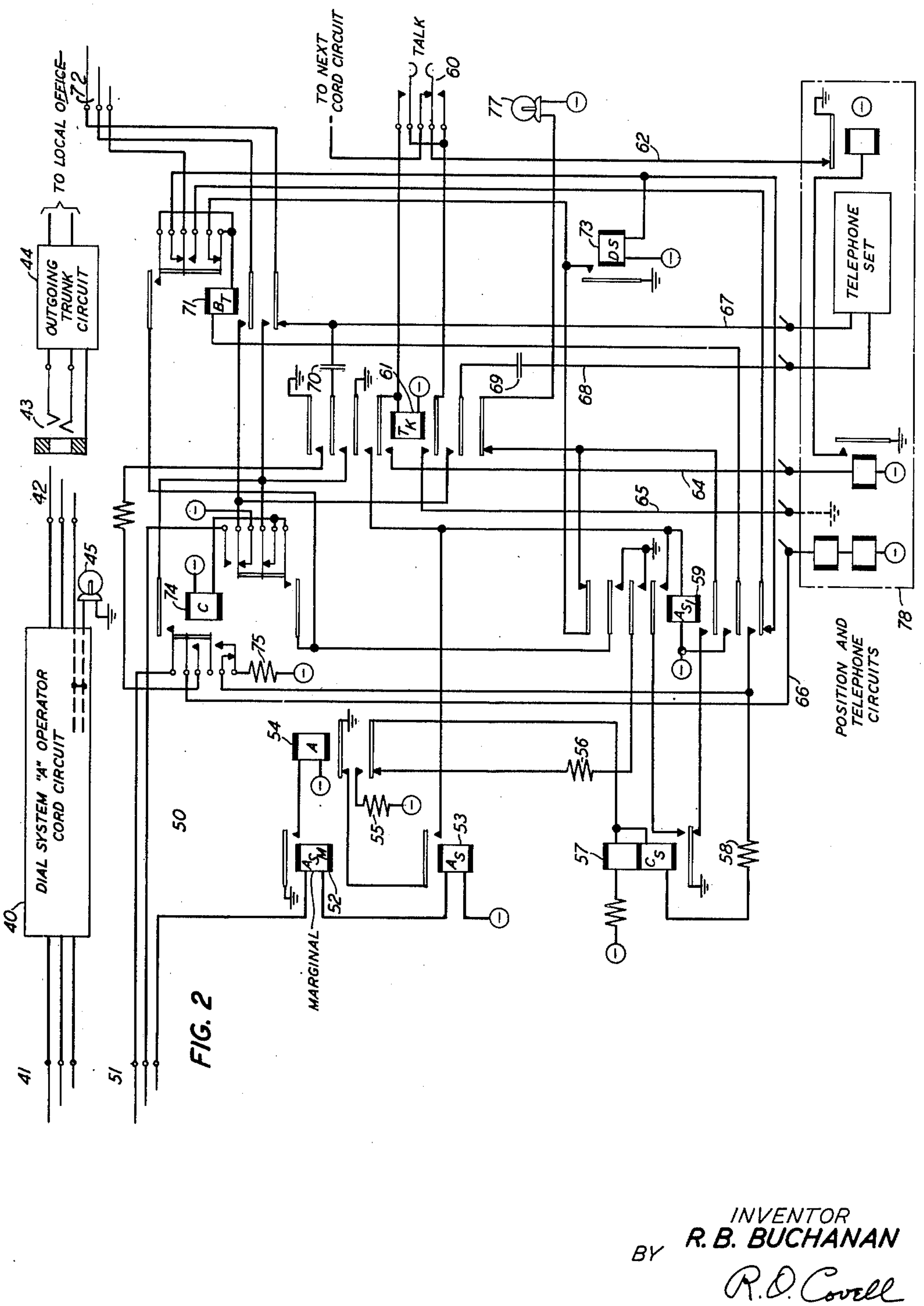
Figure 3:
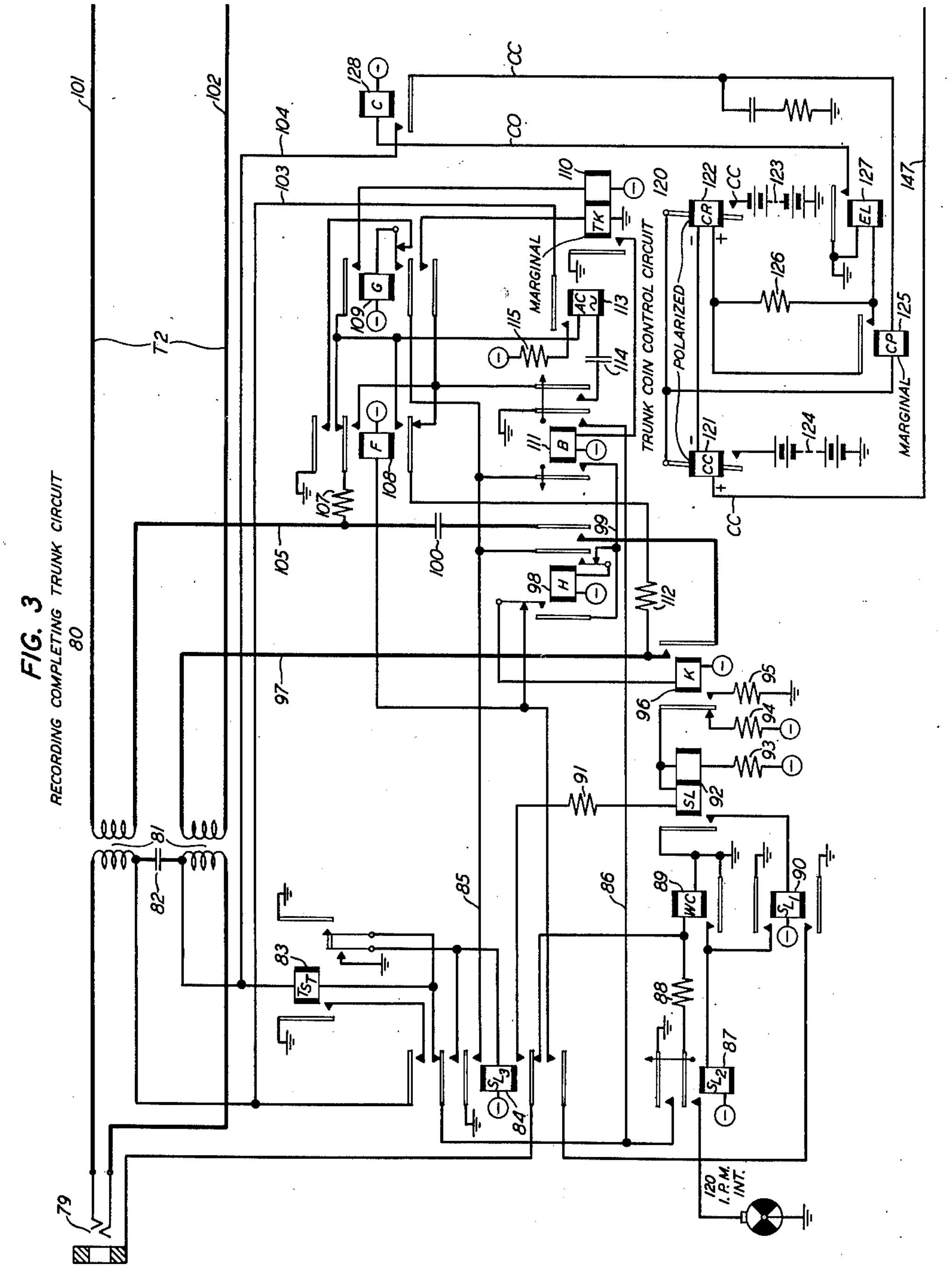
Fig. 3 shows an operator's recording-completing trunk circuit 80 associated with a trunk T2 outgoing from the dial systems "A" operator position to a toll operator position.

The local dial office shown in Fig. 1 may include switches of any known type, for instance step-by-step, panel or crossbar, but it will be assumed that this office is equipped with switches of the step-by-step type. The dial office comprises subscriber station 10 and line L, a line finder LF, a selector S, a coin trunk circuit 12 individually interconnecting line finder LF and selector S, an outgoing recording-completing trunk circuit 22 and a coin control trunk circuit 23. This office also includes connector switches, none of which are shown, for connecting with called subscriber lines. The subscriber stations are of the common battery type and each station includes a dial or other impulse sender for directly controlling the switches through which desired connections are established. The subscriber station 10 is of the prepayment coin box type but other stations may be flat rate or message rate stations. For a description of the structure of step-by-step switches and their operation when used as selectors and connectors, reference may be made to pages 53 to 56, inclusive, of "Automatic Telephony" by Smith and Campbell, second edition, published in 1920. Reference may be had to the patent to R. L. Stokely, No. 1,799,654, April 7, 1931, for a description of a step-by-step line finder. The line finder LF and selector S are each represented by a set of brushes and a single set of terminals, the other terminals, associated electromagnets, relays and other apparatus all being omitted. The coin trunk circuit 12, shown in block form in Fig. 1, provides means for detecting the presence of a coin in the coin box of the subscriber station and means for controlling the collecting and refunding of coins deposited at coin subscriber stations. Reference may be had to Patent 2,427,000, granted September 9, 1947, to H. Hovland, for a complete disclosure of such a coin trunk circuit. Non-coin subscriber lines are served by a different group of line finders which connect subscriber lines directly to selector switches. The outgoing recording-completing trunk circuit 22 may be similar to the trunk circuit B disclosed in Patent 1,753,334, granted April 8, 1930, to T. V. Curley. Only so much of trunk circuit 22 is shown as is required for a complete description of the invention.

Figures 4, 5:
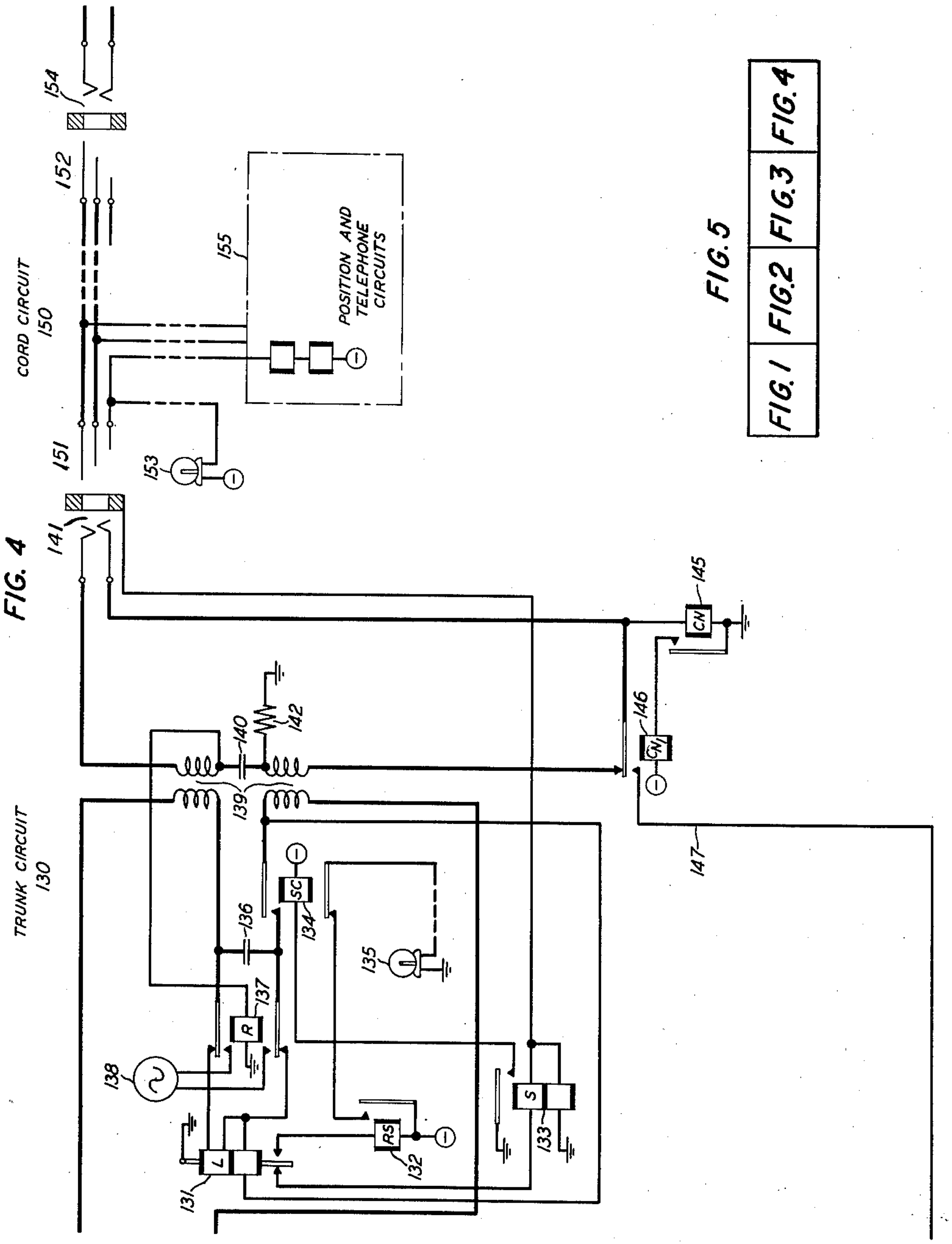

The incoming recording-completing trunk circuit 30 is jack-ended at a dial system "A" switchboard which is shown in the drawing as being located in a toll office. This "A" switchboard may, however, be located in the dial office or may be located in an office remote both from the dial office and the toll office. The dial systems "A" operator cord, position and telephone circuits are shown in schematic form; and reference may be had to Patent 2,276,515, granted March 17, 1942, to T. D. Robb, for a complete disclosure of such circuits. In addition to the cord circuits 40, which are used to extend short haul toll calls, each "A" operator position is provided with recording-completing cord circuits 50 for use in extending calls completed over intertoll trunks, one such cord circuit being shown in detail. The cord circuit 40 is used to answer calls incoming to trunk circuit 30 from the dial office; and, if the called line is located in another local office in the same local area, the incoming trunk circuit 30 is directly connected by the cord circuit 40 to an outgoing trunk circuit 44, thence over the associated trunk to the called local office. If, however, the called line is located in an office requiring the extension of the connection over an intertoll trunk, the "A" operator connects one plug of a recording-completing cord circuit 50 to the incoming trunk circuit 30, in place of the cord circuit 40 which was used to answer the call; and connects the other plug to an outgoing operator recording-completing trunk circuit 80, thence over the associated trunk T2 to an incoming trunk circuit 130 which is jack-ended at an outward operator position of the toll board. A trunk coin control circuit 120 is individually associated with the trunk circuit 80 and a similar trunk coin control circuit 23 is associated with trunk circuit 22 in the local dial office for use in controlling the collecting and refunding of coins at the calling station. The cord circuit 150 and operator position and telephone circuits 155 shown in schematic form at the toll position in Fig. 4 may be similar to the cord, position and telephone circuits disclosed in the aforementioned patent to T. D. Robb.

In response to the origination of the call by a subscriber at a prepayment coin subscriber station 10, an idle line finder LF is operated to connect the subscriber line L to the coin trunk circuit 12 and through this circuit to a first selector S. Assume that the calling subscriber dials the digit 0, in which case the selector S is operated to select the group of terminals which are connected to outgoing recording-completing trunks. The selectors S automatically select a set of terminals which are connected to an idle trunk circuit 22 which is connected by the conductors of trunk T1 to an incoming recording-completing trunk circuit 30 terminating in a jack 35 at a dial system "A" operator position. The seizure of trunk circuit 22 causes the lighting of the line lamp 34 of trunk circuit 30; and the call is answered by connecting the plug 41 of an idle cord circuit 40 to the jack 35. The lamp 34 is thereby extinguished and the calling subscriber informs the operator as to the called subscriber's directory number. If the called subscriber line terminates in a local office to which the operator has access over direct trunks, the plug 42 is connected to jack 43 of an outgoing trunk circuit 44 associated with a trunk leading to the called local office. If, however, the call is one completed over an intertoll trunk to which the dial systems "A" operator does not have direct access, the call is extended through an outgoing recording-completing trunk circuit 80, trunk T2 and incoming trunk circuit 130 which terminates at jack 141 of a toll operator position. The one or the other of two operating methods may be used by the dial systems operator to extend a call over an intertoll trunk. According to one method, the operator disconnects the cord circuit 40 from jack 35, connects plug 51 of a recording-completing cord circuit 50 to jack 35, and connects plug 72 to jack 79 of an outgoing recording-completing trunk circuit 80. The seizure of trunk circuit 80 causes the lighting of a line lamp 135 at the toll position. When a toll operator answers the call by connecting the plug 151 of a cord circuit 150 to jack 141, line lamp 135 is extinguished and the toll operator may then receive the details of the call from the calling subscriber. The dial systems "A" operator takes no further action on the call until the supervisory lamp 77 is lighted responsive to a disconnect or recall signal received from the toll operator position. When using the other method referred to above, the dial systems "A" operator connects the plug 72 of a cord circuit 50 to a jack 79 without first disconnecting cord circuit 40 from jack 35. A signal is thereby transmitted over trunk T2 to light the line lamp 135 at the toll operator position. When a toll operator connects plug 151 of a cord circuit 150 to jack 141, lamp 135 is extinguished and the operator obtains the details of the call from the dial systems operator. The dial systems "A" operator thereupon disconnects cord circuit 40 from jack 35 and connects plug 51 of cord circuit 50 to jack 35 and takes no further action until the supervisory lamp 77 is lighted responsive to a disconnect or recall signal received from the toll operator position.

When a call from a coin subscriber station has been completed, the collection or refund of coins deposited at the calling station is effected by operation of the toll operator's position coin collect or refund key, as required. Switchhook supervision is transmitted from the calling subscriber station to the toll switchboard. When the calling subscriber restores the telephone to normal at the end of conversation, the toll operator receives the disconnect signal and disconnects cord 150 from trunk circuit 130. A disconnect signal is thereby given to the dial systems "A" operator by the lighting of lamp 77; whereupon cord circuit 50 is disconnected from jacks 35 and 79 and the switches in the dial office are restored to normal.

*Detailed description*

Assume that the subscriber at station 10 originates a call, that a line finder LF operates to connect the line L through coin trunk circuit 12 to selector S, that a coin is deposited at the calling station, that the subscriber dials the digit 0 and that the selector S is thereby operated to connect with a recording-completing trunk circuit 22. When trunk circuit 22 is seized, the coin control trunk circuit 12 operates to establish a direct connection between the calling line and the trunk circuit 22 in the manner described in the aforementioned Hovland patent, whereby a circuit is closed for operating relay 8. The operation of relay 8 causes the successive operation of relays 15, 18 and 20; and the operation of relay 20 closes a circuit for operating relay 25 of trunk circuit 30. The circuit for operating relay 25 is traced from ground through the upper winding of relay 21, front contacts of relays 20 and 15, upper right winding of repeating coil 11, upper conductor of trunk T1, upper left winding of repeating coil 24 of trunk circuit 30, a back contact of relay 29, both windings of polarized relay 25, lower left winding of repeating coil 24, lower conductor of trunk T1, lower right winding of repeating coil 11, front contacts of relays 15 and 20 and through the lower winding of relay 21 to battery. Relay 21 is marginal and is not operatively energized in this circuit because the current is limited by the high resistance of the lower winding of relay 25. The operation of relay 25 closes a circuit for operating relay 26; and relay 26 closes a circuit for lighting the line lamp 34 associated with answering jack 35. When a dial systems "A" operator answers the call by inserting plug 41 of a cord circuit 40 in jack 35, a circuit is closed from battery in the operator's position circuit, through the sleeve conductors of cord 40 and jack 35, and through the lower winding of relay 27 of trunk circuit 30, to ground. Relay 27 operates, closing a circuit for operating relay 28. The operation of relay 28 extinguishes the line lamp 34, short circuits the lower, high resistance winding of relay 25, and closes a talking current transmission path through condenser 31 and repeating coil 24. The short circuiting of the high resistance winding of relay 25 increases the current through the windings of realy 21 of outgoing recording-completing trunk circuit 22; and the operation of relay 21 causes the return of the coin initially deposited at the calling station 10 in the manner described in detail in the aforementioned Curley patent.

The calling subscriber now informs the answering operator as to the directory number of the called line; and, if the call can be completed directly by this operator, the plug 42 is connected to a jack 43 associated with the trunk circuit 44. If, however, the call is one which must be routed to a toll operator position, and the second of the two aforementioned operating methods is employed, the dial systems "A" operator connects the plug 72 of a recording-completing cord circuit 50 to the jack 79 of an idle outgoing recording-completing trunk circuit 80. With the talking key 60 of the cord 50 operated and assuming that there are no other talking keys operated at this operator position, a circuit for operating relay 61 is closed through conductor 62 to ground in the position circuit 78. Relay 61 operates, locks through conductor 65 to ground in the position circuit 78, extends the locking ground through conductor 64 to the position circuit 78, and closes a circuit for operating relay 59. The operation of relay 59 connects ground through its middle upper front contact, resistor 56 and a back contact of relay 54 in series thence through the upper winding of relay 57 to battery and also through the lower winding of relay 57 in series with resistor 58, a back contact of relay 74 and resistor 75 to battery; but relay 57 does not operate at this time because the windings are oppositely energized. The connection of plug 72 to jack 79 closes a circuit from battery through the winding of relay 73, a back contact of relay 71, the sleeve conductors of plug 72 and jack 79, a back contact of relay 84 of the outgoing recording-completing trunk circuit 80, and winding of relay 89 to ground. Relays 73 and 89 operate. The operation of relay 73 completes a circuit for operating relay 71; and the operation of relay 89 closes a circuit for operating relay 87. Relay 87 connects interrupter INT through resistor 88 to the sleeve conductor; but the interrupter is without useful function at this time. Relay 71 locks under control of relay 59, opens its own operating circuit, opens the busy test connection between the tip of plug 72 and the operator's telephone set, and connects the tip and ring of plug 72 through condensers 69 and 70 to the telephone set. Relay 71 disconnects the sleeve conductor of plug 72 from the winding of relay 73 and connects this conductor to a front contact of relay 59, thence through resistor 58 to the lower winding of relay 57 and also through a back contact of relay 74 and resistor 75 to battery; whereby relay 73 releases, and relay 89 is held operated. The aforementioned operation of relays 71 and 87 closes a circuit from battery through the inner lower back contact of relay 74, a front contact of relay 71, the ring conductors of plug 72 and jack 79, lower left winding of repeating coil 81 of trunk circuit 80, winding of relay 83, a back contact of relay 84, and a front contact of relay 87 to ground. Relay 83 operates, locks independent of relay 84, and closes a circuit for operating relay 84. Relay 84 locks under control of relay 87; opens the operating circuit of relay 83; closes a circuit for operating relay 74 from ground through the left front contact of relay 83, a front contact of relay 84, upper left winding of repeating coil 81, tip conductors of jack 79 and plug 72, a front contact of relay 71, and a back contact and winding of relay 74 to battery. Relay 74 operates; locks under control of relay 59; opens its own operating circuit; disconnects battery from the ring conductor of plug 72, thereby causing the release of relay 83; closes connections between the tip and ring conductors of plugs 51 and 72; closes a connection from ground through the uppermost front contact of relay 61, a front contact of relay 74, and conductor 66 to condition the position circuit 78 for conversation between the telephone set of this circuit and a toll operator; and opens the connection from battery through resistor 75 to windings of relay 57. The aforementioned operation of relay 84 disconnects the winding of relay 89 from the sleeve conductor of jack 79 and closes a connection from this conductor through resistor 91 and left winding of relay 92 thence to battery through the right winding of relay 92 in parallel with resistor 94. Relay 92 is thereby operated by the energization of its windings in series aiding; but relay 57 does not operate since its lower winding continues to be energized differentially with respect to its upper winding after relay 74 operates, in series with the windings of relay 92. The operation of relay 92 closes a circuit for operating relay 90 and relay 90 holds relay 87 operated after relay 89 releases. The operation of relay 90 closes a circuit including a front contact of relay 84 and a back contact of relay 98 for operating relay 96. Relay 96 connects ground through resistor 95, in place of battery through resistor 94, to the windings of relay 92 thereby balancing the potentials applied to the sleeve conductors of plug 72 and jack 79 so that there is substantially no current therethrough whereupon relay 57 is operated due to the energization of its upper winding alone and relay 92 remains operated due to the energization of its right winding alone. The operation of relay 57 closes a locking circuit for relay 59. The aforementioned operation of relay 90 also closes a circuit for operating relay 108. Relay 108 closes a circuit for operating relay 109. Relay 109 operates, locks through conductor 85 under control of relay 84, and closes a circuit over trunk T2 for operating relay 131 of incoming trunk circuit 130. The circuit for operating relay 131 is traced from battery through the right winding of relay 110, front contacts of relays 109 and 108, resistor 112, conductor 97, lower right winding of repeating coil 81, conductor 102 of trunk T2, lower left winding of repeating coil 139 of trunk circuit 130, both windings of relay 131, upper back contact of relay 137, upper left winding of repeating coil 139, conductor 101 of trunk T2, upper right winding of repeating coil 81, conductor 105, resistor 107, front contacts of relays 108 and 109 and through the left winding of relay 110 to ground. Relay 131 operates but the lower winding of relay 131 is a high resistance winding and limits the current in this circuit to prevent the operation of relay 110. The operation of relay 131 disconnects ground from the upper winding of relay 133 and closes a circuit for operating relay 132. The operation of relay 132 closes a circuit for lighting lamp 135 as a calling signal to indicate that there is a call awaiting answer.

When a toll operator answers the call by connecting the plug 151 of a cord circuit 150 to answering jack 141, a circuit is closed through the sleeve conductor of plug 151 and jack 141 for operatively energizing the lower, high resistance winding of relay 133. The operation of relay 133 closes a circuit for operating relay 134. The operation of relay 134 extinguishes lamp 135; connects talking condenser 136 in series with the left windings of repeating coil 139; and closes a short circuit across the lower, high resistance winding of relay 131 thereby to cause the operation of relay 110 of trunk circuit 80. The operation of relay 110 closes a circuit for operating relay 111. The operation of relay 111 bridges relay 113 in series with condenser 114 across the conductors of trunk T2; connects ground to conductor 86 to further lock relay 84 operated; and closes a circuit including conductor 99 for operating relay 98. Relay 98 operates; locks through conductor 85 under the control of relay 84; connects the talking condenser 100 in series with the right windings of repeating coil 81; opens the operating circuit of relay 96; and closes a holding circuit for relay 96 which is traced through the left front contact of relay 98, conductor 99, front contact of relay 111, conductor 85 and a front contact of relay 84 to ground. The talking key (not shown) of cord circuit 150 having been operated, the toll operator obtains the information necessary for completion of the connection to the called subscriber from the dial systems "A" operator. After the dial systems "A" operator has passed the necessary information to the toll operator, the plug 41 of cord circuit 40 is disconnected from jack 35; and the plug 51 of cord circuit 50 is connected to jack 35 and the talking key 60 is restored to normal. When the talking key 60 of cord circuit 50 is restored to normal, relay 61 releases disconnecting the position and telephone circuits 78 from cord 50. The dial systems "A" operator takes no further action until a recall or a disconnect signal is received from the toll operator as hereinafter described. When plug 51 is connected to jack 35, relay 27 of trunk circuit 30 is operated and relays 52 and 53 of cord circuit 50 are energized. Relay 53 operates but relay 52 is marginal and does not operate due to the high resistance of the lower winding of relay 27. The operation of relay 53 connects the winding of relay 59 to ground at the back contact of relay 54 thereby to hold relay 59 operated, independent of relay 57, after relay 61 releases.

The calling line L is thus connected through trunks T1 and T2 and cord circuit 50 to the toll operator's cord circuit 150; and, when the toll operator completes the call, talking currents are transmitted through repeating coils 11, 24, 81 and 139 of trunk circuits 22, 30, 80 and 130.

The toll operator's position circuit 155 includes coin collect and coin return keys (not shown) for use in collecting and refunding coins deposited at the calling subscriber station. The operation of the coin collect key connects coin collect battery to the ring conductor of plug 151; and the operation of the coin return key connects coin return battery, of opposite polarity, to the ring conductor of plug 151. In either case, relay 145 of trunk circuit 130 is operated. The operation of relay 145 closes a circuit for operating relay 146. The operation of relay 146 disconnects the ring conductor of jack 141 from repeating coil 139 and connects this conductor through a trunk conductor 147 to the trunk coin control circuit 120 which is individually associated with trunk circuit 80, through the windings of oppositely polarized relays 121 and 122, resistor 126 and the winding of relay 127 to ground. Relay 121 is operated by current from the coin collect battery, relay 122 is operated by current from the coin return battery, and relay 127 is operated by current of either polarity. The operation of relay 127 closes a circuit for operating relay 128 and the operation of the one or the other of relays 121 and 122, closes a circuit from the corresponding one of coin control batteries 123 and 124 through the winding of relay 125, front contact of relay 128, conductor 104, lower left winding of repeating coil 81, ring conductors of jack 79 and plug 72, front contacts of relays 71 and 74, ring conductors of plug 51 and jack 35, and winding of relay 37 of trunk circuit 30 to ground. Relay 37 operates, closing a circuit for operating relay 38. The operation of relay 38 disconnects the ring conductor of jack 35 from the lower right winding of repeating coil 24 and connects this conductor to a trunk conductor 39 which extends to the trunk coin control circuit 23 which is individually associated with trunk circuit 22 in the local dial office. The trunk coin control circuit 23 is thus rendered effective to connect coin control battery of the required polarity to the ring conductor of trunk circuit 22 in the same manner that coin control trunk circuit 120 connects the desired one of batteries 123 and 124 to the ring conductor of jack 79; whereby the coins deposited at the calling station are collected or returned as desired in usual and well-known manner. Assuming that there is a coin in the coin box at the calling station at the time that the coin collect or return key is operated by the toll operator, the marginal relay (not shown) of trunk coin control circuit 23, which corresponds to relay 125 of trunk coin control circuit 120, is operated; whereby the resistance in series with conductor 39 is reduced to cause the operation of marginal relay 125. The operation of relay 125 short circuits resistor 126 to cause the operation of a marginal relay (not shown) in position circuit 155 and the lighting of a coin pilot lamp (not shown) as an indication that coin collect or return battery is being applied to the calling subscriber's line and that there is a coin in the coin box. After the coin is collected or returned, further operation of the coin key is ineffective to cause the lighting of the coin pilot lamp.

If the calling subscriber intermittently actuates the receiver hook to signal the operator, each of relays 8 and 15 of trunk circuit 22 alternately releases and reoperates thereby causing reversals of current through trunk T1 to release and reoperate relay 25 of trunk circuit 20. Each release and reoperation of relay 25 connects ground to and disconnects ground from the low resistance upper winding of relay 27 whereby the marginal relay 52 of cord circuit 50 is alternately operated and released. Each operation and release of relay 52 effects the operation and release of relay 54, whereby battery through resistor 55 is intermittently connected to the windings of relay 57 thus causing a corresponding release and reoperation of relay 92 of trunk circuit 80. Each release and reoperation of relay 92 causes the corresponding release and reoperation of relays 90 and 108 in succession. Each release and reoperation of relay 108 reverses the current through trunk T2 whereby polarized relay 131 is alternately released and reoperated; and the connection and disconnection of ground to the upper, low resistance winding of relay 133 causes the flashing of the supervisory lamp 153 of cord 150. When the calling subscriber stops actuating the receiver hook, the lamp remains extinguished. When the calling subscriber replaces the receiver on the receiver hook at the end of conversation, the lamp 153 is lighted steadily as a disconnect signal. The connection between line L and the toll operator is, however, under the control of the operators, relay 18 of trunk circuit 22 being held operated under the joint control of relays 8 and 21.

If after the calling subscriber has replaced the receiver on the receiver hook, the toll operator wishes to recall the subscriber, operation of the ringing key (not shown) of cord circuit 150 connects battery to the tip of plug 151 to operate relay 137 of trunk circuit 130. The operation of relay 137 connects ringing source 138 to the conductors of trunk T2 to operate relay 113 of trunk circuit 80. The operation of relay 113 closes a circuit from battery through resistor 115 and front contact of relay 113, conductor 103, upper left winding of repeating coil 81, tip conductors of jack 79 and plug 72, front contacts of relays 71 and 74, tip conductors of plug 51 and jack 35, upper right winding of repeating coil 24 and winding of relay 29 to ground. Relay 29 operates, connecting ringing source 36 to the conductors of trunk T1; whereby trunk circuit 22 is rendered effective to transmit ringing current to the calling line. When the ringing key is released, relays 113 and 29 release; and when the calling subscriber answers the ring, the supervisory relays of trunk circuits 22 and 30, cord circuit 50, and trunk circuits 80 and 130 are restored to the condition above described which exists during conversation.

If the toll operator wishes to recall the dial systems "A" operator, plug 151 is alternately disconnected from and reconnected to jack 141 whereby relay 133 is alternately released and reoperated. Each release and reoperation of relay 133 causes the release and reoperation of relay 134 whereby the short circuit across the lower, high resistance winding of relay 131 is alternately opened and closed to cause the alternate release and reoperation of relay 110 of trunk circuit 80. The alternate release and reoperation of relay 110 causes a corresponding release and reoperation of relays 111 and 96 in succession. The alternate release and reoperation of relay 96 alternately connects battery through resistor 94 and ground through resistor 95 to the sleeve conductor of jack 79, thereby causing the alternate release and reoperation of relay 57 of cord circuit 50. Each release of relay 57 closes a circuit from ground through the back contact of relay 57, inner lower front contact of relay 59 and back contact of relay 61 to light supervisory lamp 77. The flashing of lamp 77 signals the dial systems operator and operation of key 60 effects the operation of relay 61 to again connect the dial systems operator's telephone set to the cord circuit 50. When the toll operator removes plug 151 from jack 141 to release the connection, relays 133, 134, 110, 111, 96 and 57 release in succession, and lamp 77 is lighted steadily. If at this time the calling subscriber has restored the receiver to normal, relays 52 and 54 of cord circuit 50 have been operated as above described; and, when relay 57 releases, relay 59 is released. The release of relay 59 disconnects the windings of relay 57 from the sleeve conductor of plug 72 and relays 92 and 90 of trunk circuit 80 are thereby released in succession. The release of relay 59 reconnects the winding of relay 73 to the sleeve conductor of plug 72 and causes the release of relays 71 and 74, thereby opening the talking connection between plugs 51 and 72 and reconnecting the winding of relay 73 directly to the sleeve of plug 72. The release of relay 92 causes the release of relays 90, 87 and 108; and, with both of relays 87 and 111 released, the locking circuit of relay 84 is opened and relay 84 releases. The release of relay 84 causes the release of relay 109 and reconnects the winding of relay 89 to the sleeve conductor of jack 79 in place of the windings of relay 92, whereby relays 89 and 73 are reoperated in series. With relays 59 and 61 released the operation of relay 73 lights lamp 77 as a disconnect signal. The reoperation of relay 89 causes the reoperation of relay 87. When the dial systems "A" operator notices the lighting of lamp 77, plugs 51 and 72 are disconnected from jacks 35 and 79, thereby causing the release of relays 73, 89 and 87 to completely restore trunk circuits 80 and 130 to normal and causing the release of relay 27 of trunk circuit 30. The release of relay 27 causes the release of relays 28 and 21 in succession; and with relays 8 and 15 also released, relay 18 releases. The release of relay 18 disconnects holding ground potential from the sleeve conductor; whereupon the selector and line finder switches are restored to normal in usual and well-known manner and trunk circuits 12 and 22 are completely restored to normal.

In case the other of the two aforementioned operating methods is used by the dial systems "A" operator on calls which are routed to a toll operator, the plug 51 of a cord circuit 50 is connected to jack 35 in place of plug 41 of cord 40 as soon as the call information has been obtained from the calling subscriber; and plug 72 is connected to the jack 79 of an idle outgoing recording-completing trunk circuit 80. In this case the talking key 60 is not operated, relay 61 remains normal, the toll operator obtains the call information directly from the calling subscriber, and the dial systems "A" operator takes no further action until the supervisory lamp 77 lights as a disconnect signal or flashes as a recall signal. When plug 51 is connected to jack 35, relay 53 is operated in series with relay 27; the operation of relay 27 causes the successive operation of relays 28 and 21; and the operation of relay 53 causes the operation of relay 59. The succeeding operations occur in the manner and order hereinbefore described.

If the dial systems "A" operator should connect the plug of a cord 40 to jack 79 in error, battery is connected through the sleeve conductor of plug 72 and jack 79 to operate relay 89. The operation of relay 89 closes the circuit for operating relay 87 and relay 87 connects interrupter INT to the sleeve conductor of jack 79 in parallel with the winding of relay 89. Each time the interrupter ground connection is closed, the cord supervisory lamp 45 is lighted thereby indicating to the dial systems "A" operator that the wrong cord has been connected to jack 79.

What is claimed is:

1. In a telephone system comprising a first operator position and a two-wire subscriber recording-completing trunk terminating at said position, a toll operator position, a two-wire operator recording-completing trunk extending from said first operator position to said toll operator position, a recording-completing cord circuit at said first operator position for extending connections from said subscriber recording-completing trunk over said operator recording-completing trunk to said toll operator position, each end of said cord circuit comprising talking conductors and a sleeve conductor, and means comprising the sleeve conductors of said recording-completing cord circuit for repeating supervisory signals from said subscriber recording-completing trunk to said operator recording-completing trunk.

2. In a telephone system comprising a first operator position and a two-wire subscriber recording-completing trunk terminating at said position, a toll operator position, a two-wire operator recording-completing trunk extending from said first operator position to said toll operator position, a recording-completing cord circuit at said first operator position for extending connections from said subscriber recording-completing trunk over said operator recording-completing trunk to said toll operator position, each end of said cord circuit comprising talking conductors and a sleeve conductor, means comprising the sleeve conductors of said recording-completing cord circuit for repeating supervisory signals from said subscriber recording-completing trunk to said operator recording-completing trunk, and means in said cord circuit for responding to supervisory signals transmitted over said operator recording-completing trunk from said toll operator position.

3. In a telephone system comprising a first operator position and a two-wire subscriber recording completing trunk terminating at said position, a toll operator position, a two-wire operator recording-completing trunk extending from said first operator position at said toll operator position, a recording-completing cord circuit at said first operator position for extending connections from said subscriber recording-completing trunk over said operator recording-completing trunk to said toll operator position, each end of said cord circuit comprising talking conductors and a sleeve conductor, means comprising the sleeve conductors of said recording-completing cord circuit for repeating supervisory signals from said subscriber recording-completing trunk to said operator recording-completing trunk, means at said toll position for applying coin collect or coin return electrical potential to a talking conductor of said operator recording-completing trunk, and means including means individually associated with said operator recording-completing trunk for extending the coin control potential from said talking conductor through a talking conductor of said cord circuit to the corresponding conductor of said subscriber recording-completing trunk.

4. In a telephone system, a dial systems operator position, a subscriber recording-completing trunk for extending calls from calling subscribers in a local dial office to said position, a toll operator position, an operator recording-completing trunk extending from said dial systems operator position to said toll position, a recording-completing cord circuit at said dial systems operator position, a jack ended outgoing trunk circuit associated with the dial systems operator end of said operator recording-completing trunk, a jack ended incoming trunk circuit associated with the toll operator end of said operator recording-completing trunk, a calling signal at said toll operator position associated with said incoming trunk circuit, means comprising the sleeve conductors of the calling plug of said cord circuit and said outgoing trunk circuit and relay means in said outgoing and incoming trunk circuits for energizing said calling signal upon connection of said calling plug to said outgoing trunk circuit, a supervisory signal in said recording-completing cord circuit, a cord circuit at said toll operator position for connection with said incoming trunk circuit to answer a call, means in said recording-completing cord circuit responsive to the connection of the calling plug with said outgoing trunk circuit for connecting the talking conductors of the answering plug to the talking conductors of the calling plug, a first supervisory relay in said recording-completing cord circuit for operation through the sleeve conductor of the answering plug upon connection to said subscriber recording-completing trunk, a second supervisory relay in said recording-completing cord circuit for operation through the sleeve conductor of the calling plug upon connection to said operator recording-completing trunk, means comprising said first supervisory relay for transmitting supervisory signals received over the sleeve conductor of said answering plug through the sleeve conductor of said calling plug, said outgoing trunk circuit, said operator recording-completing trunk and said incoming trunk circuit to said toll operator cord circuit, and means for operating said supervisory signal in said recording-completing cord circuit responsive to supervisory signals received by said second supervisory relay through said outgoing trunk circuit, said operator recording-completing trunk and said incoming trunk circuit from said toll operator position.

RUSSELL B. BUCHANAN.

References Cited in the file of this patent

UNITED STATES PATENTS

| Number | Name | Date |
|---|---|---|
| 2,288,789 | Crocker | July 7, 1942 |
| 2,385,720 | Molnar | Sept. 25, 1945 |
| 2,428,549 | Burgener | Oct. 7, 1947 |
| 2,558,571 | Lamberty | June 26, 1951 |